(12) United States Patent  
Long et al.

(10) Patent No.: US 9,954,393 B2
(45) Date of Patent: Apr. 24, 2018

(54) POWER DISTRIBUTION SYSTEMS

(71) Applicant: GE Energy Power Conversion Technology Ltd, Ruby (GB)

(72) Inventors: Teng Long, Rugby (GB); Stephen Wood, Rugby (GB); Ushindibaba Mupambireyi, Coventry (GB)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 64 days.

(21) Appl. No.: 15/136,580

(22) Filed: Apr. 22, 2016

(65) Prior Publication Data
US 2016/0315501 A1    Oct. 27, 2016

(30) Foreign Application Priority Data
Apr. 23, 2015 (EP) .................................... 15164879

(51) Int. Cl.
*H02J 9/00* (2006.01)
*H01F 1/00* (2006.01)
(Continued)

(52) U.S. Cl.
CPC .............. *H02J 9/066* (2013.01); *B63J 3/02* (2013.01); *H02J 3/38* (2013.01); *H02M 7/68* (2013.01); *H02J 9/00* (2013.01)

(58) Field of Classification Search
USPC .................................................. 307/9.1, 68
See application file for complete search history.

(56) References Cited

U.S. PATENT DOCUMENTS 6,177,738 B1    1/2001  Hentunen
2001/0038544 A1*  11/2001  Ainsworth ............... H02J 3/36
                                                                        363/71

(Continued)

FOREIGN PATENT DOCUMENTS

DE  19519424 A1  11/1996
EP   2090508 A2   8/2009

OTHER PUBLICATIONS

European Search Report issued in connection with corresponding EP Application No. 15164879 dated Dec. 3, 2015.

*Primary Examiner* — Adam Houston
(74) *Attorney, Agent, or Firm* — GE Global Patent Operation; Scott R. Stanley

(57) ABSTRACT

A power distribution system is described. The system includes a main ac busbar and an emergency ac busbar. A hybrid drive system includes an induction electrical machine and a prime mover, the rotor of the electrical machine and the driving end of the prime mover being mechanically coupled to a load by means of a mechanical linkage such as a gearbox. The system includes a first active rectifier/inverter having ac input terminals electrically connected to the main ac busbar, and dc output terminals. The system includes a second active rectifier/inverter having dc input terminals electrically connected to the dc output of the first active rectifier/inverter by a dc link, and ac output terminals electrically connected to the induction electrical machine. A blackout restart system includes a rectifier having ac input terminals selectively electrically connectable to the emergency ac busbar and dc output terminals selectively electrically connectable to the dc link.

20 Claims, 9 Drawing Sheets

(51) Int. Cl.
*H01F 3/00* (2006.01)
*H02J 1/16* (2006.01)
*H02J 3/30* (2006.01)
*H02J 9/06* (2006.01)
*H02J 3/38* (2006.01)
*B63J 3/02* (2006.01)
*H02M 7/68* (2006.01)

(56) References Cited

U.S. PATENT DOCUMENTS

| | | | | |
|---|---|---|---|---|
| 2009/0040724 A1* | 2/2009 | Nishikimi | | H05K 7/20927 |
| | | | | 361/699 |
| 2009/0156068 A1 | 6/2009 | Barrett | | |
| 2009/0161301 A1* | 6/2009 | Woody | | H05K 7/209 |
| | | | | 361/678 |
| 2010/0283318 A1* | 11/2010 | Crane | | B63H 23/24 |
| | | | | 307/9.1 |
| 2010/0284117 A1* | 11/2010 | Crane | | B63H 21/20 |
| | | | | 361/93.1 |
| 2011/0000721 A1* | 1/2011 | Hassett | | B60K 6/48 |
| | | | | 180/65.22 |
| 2011/0048827 A1* | 3/2011 | Cherney | | B60K 6/46 |
| | | | | 180/65.245 |
| 2011/0057512 A1* | 3/2011 | Prax | | F03D 9/007 |
| | | | | 307/18 |
| 2011/0084670 A1* | 4/2011 | Childs | | H02P 25/22 |
| | | | | 322/90 |
| 2012/0153719 A1* | 6/2012 | Inaba | | B60L 3/003 |
| | | | | 307/10.1 |
| 2012/0309242 A1 | 12/2012 | Haugland | | |
| 2013/0200691 A1* | 8/2013 | Crane | | B63H 23/24 |
| | | | | 307/9.1 |
| 2013/0265808 A1* | 10/2013 | Ishii | | H02M 1/12 |
| | | | | 363/97 |
| 2013/0278194 A1* | 10/2013 | Numakura | | B60L 3/003 |
| | | | | 318/400.27 |
| 2013/0279230 A1* | 10/2013 | Suwa | | H01L 23/4334 |
| | | | | 363/141 |
| 2014/0077607 A1* | 3/2014 | Clarke | | H02J 3/005 |
| | | | | 307/75 |
| 2014/0092650 A1* | 4/2014 | Alston | | H02J 3/36 |
| | | | | 363/35 |
| 2014/0145448 A1* | 5/2014 | Lewis | | B63H 21/17 |
| | | | | 290/55 |
| 2014/0175796 A1* | 6/2014 | Rasmussen | | F03D 7/028 |
| | | | | 290/44 |
| 2014/0290591 A1 | 10/2014 | Filip | | |
| 2015/0035286 A1 | 2/2015 | Stephens | | |
| 2015/0152850 A1* | 6/2015 | Nielsen | | F03D 9/005 |
| | | | | 290/44 |
| 2015/0214205 A1* | 7/2015 | Tokuyama | | H01L 25/18 |
| | | | | 257/139 |
| 2015/0263569 A1* | 9/2015 | Brogan | | H02J 3/36 |
| | | | | 290/44 |
| 2015/0295403 A1* | 10/2015 | Lewis | | H02J 1/00 |
| | | | | 307/26 |
| 2015/0333677 A1* | 11/2015 | Letas | | H02P 9/02 |
| | | | | 290/44 |
| 2016/0218650 A1* | 7/2016 | Gajanayake | | F01D 15/10 |
| 2016/0315501 A1* | 10/2016 | Long | | H02J 3/38 |
| 2017/0005478 A1* | 1/2017 | Dorn | | F03D 9/10 |
| 2017/0009745 A1* | 1/2017 | Brogan | | H02P 21/50 |
| 2017/0054347 A1* | 2/2017 | Lei | | H01L 25/07 |
| 2017/0093268 A1* | 3/2017 | Maksimainen | | H02J 3/383 |
| 2017/0170663 A1* | 6/2017 | Christ | | H02J 3/386 |

\* cited by examiner

POWER DISTRIBUTION SYSTEMS

TECHNICAL FIELD

Embodiments of the present invention relate to power distributions systems, and in particular to marine power distribution systems or marine power distribution and propulsion systems. The term 'marine vessels' is intended to include ships, drilling rigs and any other surface-going vessels or platforms or submersible (submarine) vessels.

BACKGROUND

Marine power distribution and propulsion systems are well known. In a typical arrangement a series of power converters are used to interface a main ac busbar to a series of loads which can be electric motors, e.g., propulsion motors or thrusters. Other loads can be connected directly to the main ac busbar or connected to an auxiliary ac busbar which is in turn connected to the main ac busbar by means of a transformer. The ac busbars typically operate at different voltages, e.g., 690 VAC and 440 VAC.

Each power converter can be an 'active front end' (AFE) converter with a supply-side active rectifier/inverter (or 'front end' bridge) having ac terminals connected to the main ac busbar and a load-side active rectifier/inverter connected to the load. The dc output of the supply-side active rectifier/inverter is connected to the dc input of the load-side active rectifier/inverter by a dc link. In normal operation, the supply-side active rectifier/inverter will operate as an active rectifier to supply power to the dc link and the load-side active rectifier/inverter will operate as an inverter to supply power to the load. Each active rectifier/inverter will typically have a conventional topology.

A prime mover (e.g., a diesel engine or turbine) is connected to individual generators which supply power to the main ac busbar. The main ac busbar can be equipped with protective switchgear with circuit breakers and associated controls.

The marine propulsion system will typically include a first (or port) ac busbar and a second (or starboard) ac busbar that are interconnected by a busbar tie. Some marine propulsion systems use a plurality of ac busbar sections or groups interconnected by a plurality of busbar ties to improve power availability.

In one arrangement, shown in FIG. 1, the marine propulsion system 1 includes a power take-in/power take-out (PTI/PTO) hybrid drive system 2. The hybrid drive system 2 includes an induction (or asynchronous) electrical machine 4 and a diesel engine 6. The rotor of the electrical machine 4 and the driving end of the diesel engine 6 are mechanically coupled through a gearbox 8 and are used to drive a propulsion thruster 10, for example. The electrical machine 4 is connected to the main ac busbar 12 by means of an AFE converter 14 with a supply-side active rectifier/inverter 16 having ac terminals connected to the main ac busbar and a machine-side active rectifier/inverter 18 connected to the electrical machine. The dc output of the supply-side active rectifier/inverter 16 is connected to the dc input of the machine-side active rectifier/inverter 18 by a dc link 20. During a PTI mode, the electrical machine 4 is operated as a motor and is used to drive the propulsion thruster. Power is supplied to the electrical machine 4 from the main ac busbar 12 through the AFE converter 14 with the ac supply-side active rectifier/inverter 16 being operated as an active rectifier and the machine-side active rectifier/inverter 18 being operated as an inverter. During a PTO mode, the electrical machine 4 is operated as a generator with the rotor of the electrical machine being driven by the diesel engine 6. Power is supplied from the electrical machine 4 to the main ac busbar 12 through the AFE converter 14 with the machine-side active rectifier/inverter 18 being operated as an active rectifier and the supply-side active rectifier/inverter 16 being operated as an inverter. Diesel generators 22, 24 supply power to the main ac busbar 12.

If the marine propulsion system 1 is in an electric power blackout situation, the diesel generators 22, 24 are non-operational and the electrical machine 4 typically needs to recover the main ac busbar 12 by supplying power to the main ac busbar through the AFE converter 14. In other words, the electrical machine 4 will be driven by the diesel engine 6 and operated as a generator. Embodiments of the present invention provides a way of supplying power to magnetise the electrical machine 4 during a restart process so that it can subsequently supply power to the main ac busbar 12 for recovery purposes during an electric power blackout situation.

SUMMARY OF THE INVENTION

Embodiments of the present invention provides a power distribution system (e.g., a marine power distribution or a marine power distribution and propulsion system) comprising: a main ac busbar; an emergency ac busbar; a hybrid drive system comprising: an electrical machine and a prime mover, the rotor of the electrical machine and the driving end of the prime mover being mechanically coupled to a load, e.g., by means of a mechanical linkage such as a gearbox; a first active rectifier/inverter (or supply bridge) having: ac input terminals electrically connected to the main ac busbar, and dc output terminals; a second active rectifier/inverter (or machine bridge) having: dc input terminals electrically connected to the dc output of the first active rectifier/inverter by a dc link, and ac output terminals electrically connected to the electrical machine; and a blackout restart system comprising a rectifier having ac input terminals selectively electrically connectable to the emergency ac busbar, and dc output terminals selectively electrically connectable to the dc link.

The electrical machine will typically be an induction (or asynchronous) machine. But if the electrical machine is an external-excitation synchronous machine and the excitation circuit is not operational for any reason, the blackout restart system and process described herein can be used to provide power to the excitation circuit.

At least one ac generator will normally be electrically connected to the main ac busbar. The ac generators provide power to the main ac busbar during normal operation of the power distribution system and each has an associated prime mover, e.g., a diesel engine or turbine.

In the event of an electric power blackout situation, where no power is supplied to the main ac busbar from the one or more ac generators, the blackout restart system can be used to partially charge the dc link from the emergency ac busbar as part of a blackout restart process. The emergency ac busbar is a separate ac busbar that is used to maintain power to critical loads in the event of an electric power blackout situation. Typically, the emergency ac busbar will have its own dedicated power supply, e.g., a suitable uninterruptable power supply (UPS) that can provide near-instantaneous power to the emergency ac busbar and/or a back-up ac generator such as a diesel generator. In the case of a marine power distribution system or marine power distribution and propulsion system, the critical loads could include communication systems, navigation systems etc. The use of the blackout restart system may have a minimal impact on the operation of the emergency ac busbar in supporting these critical loads.

Each active rectifier/inverter (or bridge) employed in the power distribution system can have any suitable topology such as a two-level, three-level or multi-level topology with a series of semiconductor power switching devices fully controlled and regulated using a pulse width modulation (PWM) strategy, for example.

The power distribution system as described herein can be a marine power distribution system or marine power distribution and propulsion system. In this case, the hybrid drive system can be used to drive a propeller or propulsion thruster. The hybrid drive system can use any suitable prime mover, e.g., a diesel engine or turbine.

The blackout restart system can be electrically connected to the emergency ac busbar by a circuit breaker, protective switchgear or other protective circuits for fault isolation purposes.

The rectifier can have any suitable topology such as an active topology with a series of semiconductor power switching devices fully controlled or regulated using a PWM strategy, for example, or a passive topology with a series of diodes (diode bridge).

The ac input terminals of the rectifier can be electrically connected to the emergency ac busbar by an ac contactor or other switching means. The dc output terminals of the rectifier can be electrically connected to the dc link by a dc contactor or other switching means. The ac contactor and/or the dc contactor can be of any suitable type and can be controlled (i.e., opened and closed) by a control unit. Both the ac contactor and the dc contactor are closed to electrically connect the blackout restart system between the emergency ac busbar and the dc link, i.e., so that power can flow from the emergency ac busbar to the dc link as part of a blackout restart process. The blackout restart system is considered to be electrically disconnected if at least one of the ac contactor and the dc contactor is opened. In an embodiment, the blackout restart system is electrically disconnected from the dc link by opening the dc contactor so that the rectifier can use lower rated components, i.e., components that are rated for the partial dc link voltage.

The blackout restart system can include a transformer having primary and secondary windings. The primary winding can be electrically connected to the ac contactor and the secondary winding can be electrically connected to the ac input terminals of the rectifier. The transformer can isolate the blackout restart system from the emergency ac busbar and provide protection and common mode noise filtering benefits. The transformer can have any suitable transformer ratio and can provide a step-up/step-down function if needed. The transformer and the rectifier can have any suitable number of phases, e.g., three. Charging current flowing through the blackout restart system can be limited by the line impedance of the transformer and by the firing angle of the rectifier if an active topology is used.

Embodiments of the present invention further provide a method of operating the power distribution system according to any preceding claim in the event of an electric power blackout situation, the method including the steps of: electrically connecting the blackout restart system between the emergency ac busbar and the dc link; supplying power from the emergency ac busbar to the dc link through the blackout restart system to increase the dc link voltage to a partial dc link voltage that is less than the rated dc link voltage (i.e., to partially charge the dc link); operating the second active rectifier/inverter as an inverter to supply the partial dc link voltage to the electrical machine to increase the magnetic flux of the electrical machine to a partial magnetic flux that is less than the rated magnetic flux (i.e., to partially flux or magnetise the electrical machine); electrically disconnecting the blackout restart system from the emergency ac busbar and/or the dc link; supplying current from the electrical machine to the dc link through the second active rectifier/inverter to increase the dc link voltage to the rated dc link voltage (i.e., the fully charge the dc link); and increasing the magnetic flux of the electrical machine to the rated magnetic flux (i.e., the fully flux or magnetise the electrical machine).

Embodiments of the present invention further provide a method of operating a power distribution system (e.g., a marine power distribution or a marine power distribution and propulsion system) in the event of an electric power blackout situation, the power distribution system comprising: a main ac busbar; an emergency ac busbar; a hybrid drive system comprising: an electrical machine and a prime mover, the rotor of the electrical machine and the driving end of the prime mover being mechanically coupled to a load, e.g., by means of a mechanical linkage such as a gearbox; a first active rectifier/inverter having: ac input terminals electrically connected to the main ac busbar, and dc output terminals; a second active rectifier/inverter having: dc input terminals electrically connected to the dc output of the first active rectifier/inverter by a dc link, and ac output terminals electrically connected to the electrical machine; wherein the method comprises the steps of: supplying power from the emergency ac busbar to the dc link to increase the dc link voltage to a partial dc link voltage that is less than the rated dc link voltage (i.e., to partially charge the dc link); operating the second active rectifier/inverter as an inverter to supply the partial dc link voltage to the electrical machine to increase the magnetic flux of the electrical machine to a partial magnetic flux that is less than the rated magnetic flux (i.e., to partially flux or magnetise the electrical machine); supplying current from the electrical machine to the dc link through the second active rectifier/inverter to increase the dc link voltage to the rated dc link voltage (i.e., to fully charge the dc link); and increasing the magnetic flux of the electrical machine to the rated magnetic flux (i.e., the fully flux or magnetise the electrical machine).

During the step of partially fluxing or magnetising the electrical machine, the second active rectifier/inverter can be controlled so that the output ac voltage of the second active rectifier/inverter has a predetermined magnitude and/or a frequency substantially synchronous to the rotating angular velocity of the electrical machine. The second active rectifier/inverter can be operated for a predetermined time. In one arrangement, the partial dc link voltage can be between about 10% and about 40% (more particularly about 30%) of the rated dc link voltage and the partial magnetic flux can be between about 10% and about 40% (more particularly about 30%) of the rated magnetic flux of the electrical machine.

A slip control process can be used to supply power from the electrical machine to the dc link. The slip control process can provide a small difference (or slip) between the synchronous speed and the rotor speed so that a torque is generated by the electrical machine. The generated torque can then be used to drive the electrical machine in a generating mode. In one arrangement, the second active rectifier/inverter can be operated as a rectifier to supply current from the electrical machine to the dc link to increase the dc link voltage to the rated dc link voltage and then subsequently operated as an inverter to supply the rated dc link voltage to the electrical machine to increase the magnetic flux of the electrical machine to the rated magnetic flux. In another arrangement, the second active rectifier/inverter can be operated as a rectifier to supply current from the electrical machine to the dc link to increase the dc link voltage to the rated dc link voltage whilst at the same time the magnetic flux of the electrical machine is increased to the rated magnetic flux. In other words, it is possible to use a slip control process to increase the dc link voltage and the magnetic flux of the electrical machine at the same time using a suitable slip control process.

Unless explicitly stated, any components that are electrically connected do not need to be directly electrically connected but can be indirectly electrically connected by interposing components where appropriate.

DRAWINGS

DETAILED DESCRIPTION

While embodiments of the innovation may be implemented in any environment using synchronous electric machine or main machine, a specific example of which is a generator. The generator is currently contemplated to be implemented in a jet engine environment. Embodiments of the innovation may alternatively include a starter/generator and may provide turbine engine starting capabilities, wherein the starter/generator provides the mechanical power to drive the turbine engine through a starting method. A brief summary of the contemplated generator environment should aid in a more complete understanding.

Figure 1:
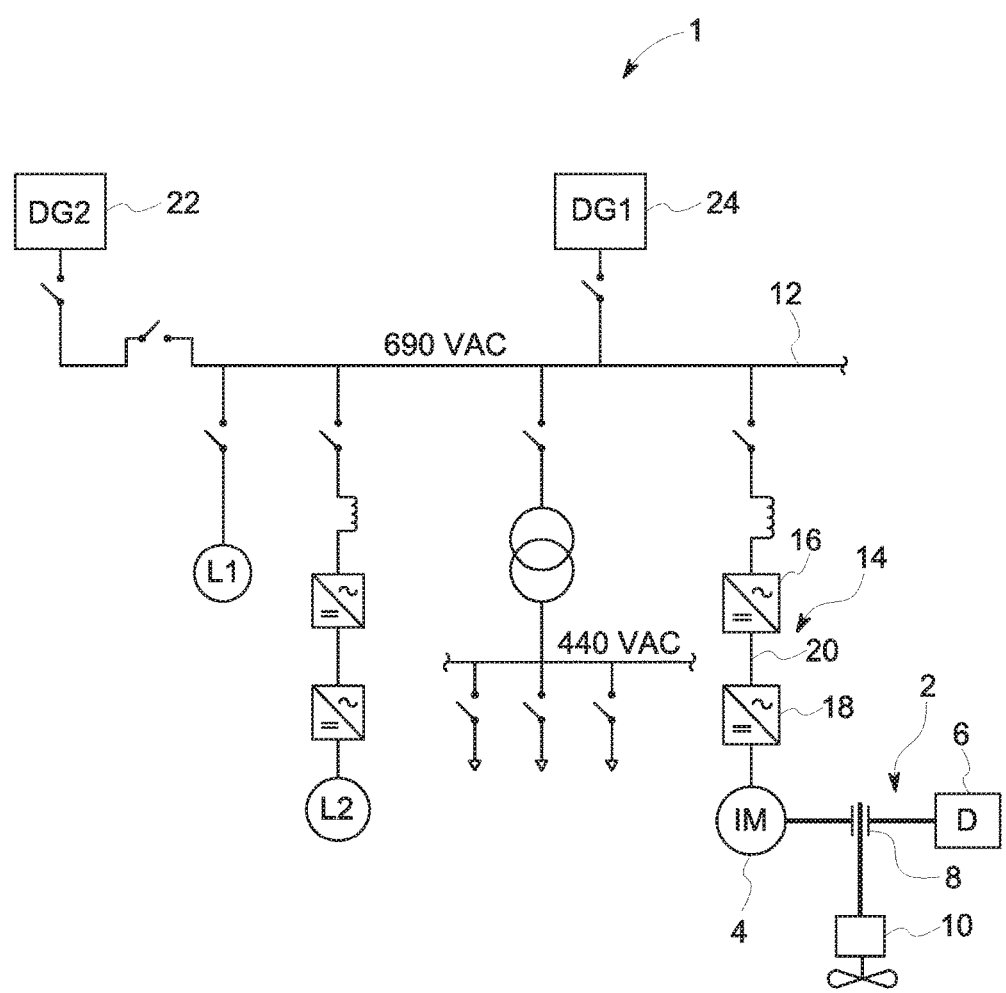
FIG. 1 is a schematic drawing showing a known marine power distribution and propulsion system with a hybrid drive system.
Figure 2:
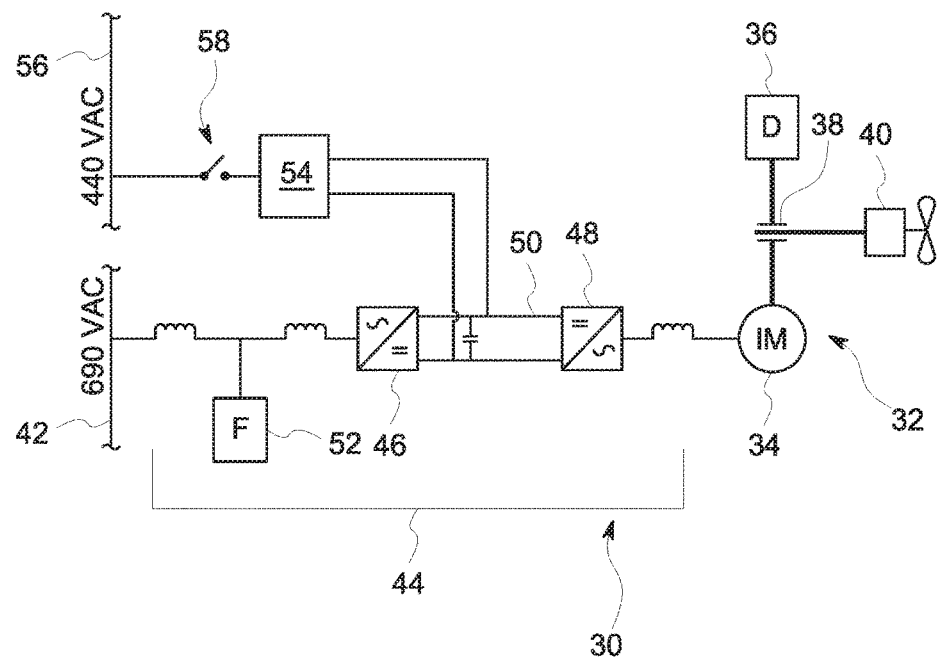
FIG. 2 is a schematic drawing showing part of a marine power distribution and propulsion system with a restart system according to various aspects described herein.

With reference to FIG. 2, a marine power distribution and propulsion system 30 according to an embodiment of the present invention includes a PTI/PTO hybrid drive system 32. The hybrid drive system 32 includes an induction (or asynchronous) electrical machine 34 and a diesel engine 36. The rotor of the electrical machine 34 and the driving end of the diesel engine 36 are mechanically coupled through a gearbox 38 and are used to drive a propulsion thruster 40, for example.

The electrical machine 34 is connected to a main ac busbar 42 by means of an AFE converter 44 with a supply bridge 46 having ac terminals connected to the main ac busbar by means of a filter 52 and a machine bridge 48 connected to the terminals of the electrical machine. The dc output of the supply bridge 46 is connected to the dc input of the machine bridge 48 by a dc link 50 with one or more capacitors.

Diesel generators (not shown) supply power to the main ac busbar 42.

A blackout restart system 54 is electrically connected between an emergency ac busbar 56 and the dc link 50 of the AFE converter 44. The blackout restart system 54 is electrically connected to the emergency ac busbar 56 by a circuit breaker 58. It will be readily understood that the circuit breaker 58 is not operated as part of the blackout restart process described in more detail below, but only for fault isolation and protection purposes.

Figure 3:
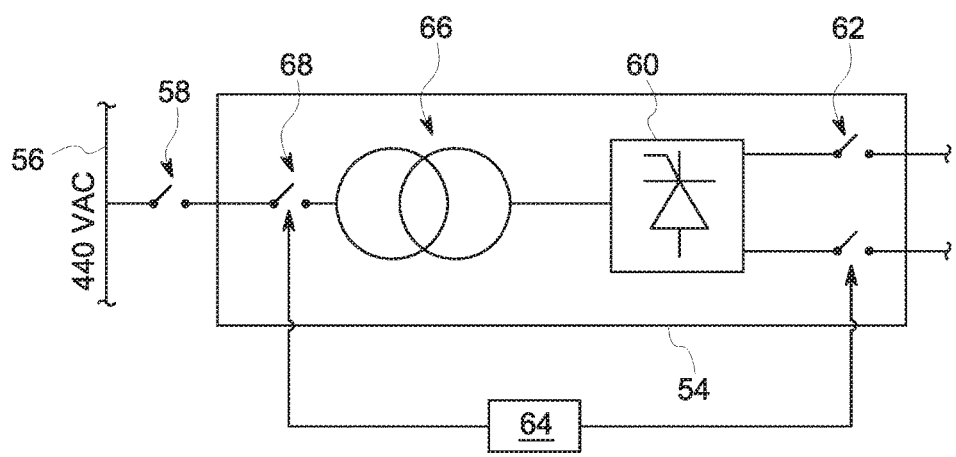
FIG. 3 is a schematic drawings showing the restart system of FIG. 2.

The blackout restart system 54 is shown in more detail in FIG. 3 and includes a rectifier 60. The semiconductor switching devices of the rectifier 60 can be controlled by a control unit (not shown). The rectifier 60 has dc output terminals that are electrically connected to the dc link 50 by a dc contactor 62 that is controlled to open and close by a control unit 64. The rectifier 60 has ac input terminals that are electrically connected to a transformer 66. The transformer 66 includes a primary winding that is electrically connected to the emergency ac busbar 56 by an ac contactor 68 that is controlled to open and close by the control unit 64, and a secondary winding that is electrically connected to the ac input terminals of the rectifier 60. The rectifier 60 and the transformer 66 can have any suitable number of phases, e.g., three.

When the marine distribution and propulsion system is operating normally, the ac contactor 68 and the dc contactor 62 are open so that the blackout restart system 54 is electrically disconnected from the emergency ac busbar 56 and the dc link 50.

Figure 4:
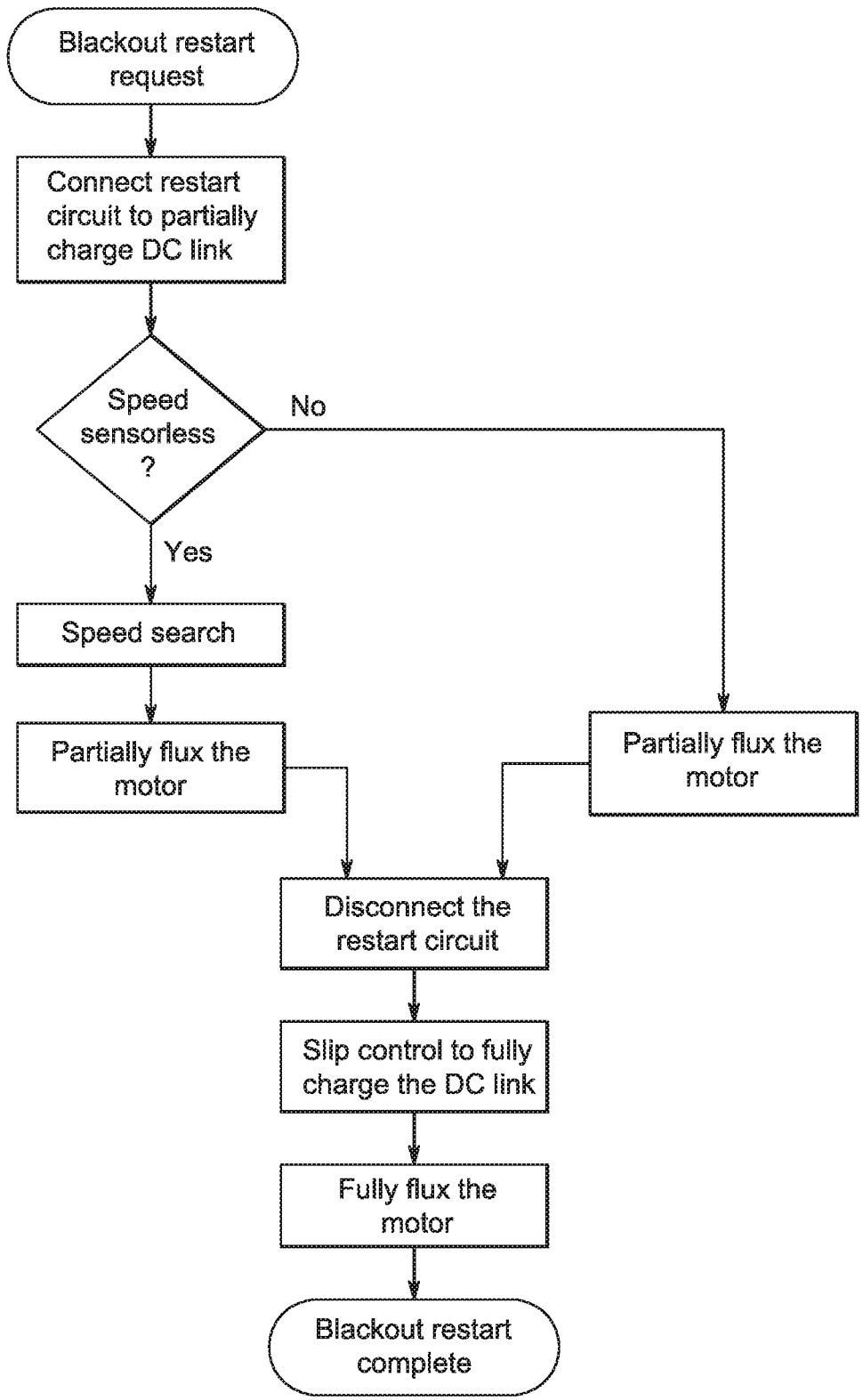
FIG. 4 is a flow diagram showing the steps of a blackout restart process according to various aspects described herein.

If the marine vessel experiences an electric power blackout situation, i.e., the diesel generators (not shown) are non-operational, the hybrid drive system 32 can be used to recover the main ac busbar 42 by supplying power to it. In other words, the electrical machine 34 can be driven by the diesel engine 36 so that it is operated as a generator in a PTO mode to supply power to the main ac busbar 42 through the AFE converter 44. But before the electrical machine 34 can be operated as a generator, it must receive power in order to magnetise. This can be achieved using a multi-step blackout restart process described with reference to FIG. 4.

In response to a blackout restart request, the ac contactor 68 and the dc contactor 62 are controlled to close to electrically connect the restart system 54 to the emergency ac busbar 56 and the dc link 50 of the AFE converter 44. The rectifier 60 is also enabled. The blackout restart request can be manually triggered by an operator, or triggered automatically by a separate control or monitoring process, for example.

Power is supplied from the emergency ac busbar 56 through the restart system 54 to partially charge the dc link 50 of the AFE converter 44. It will be readily appreciated that any reference herein to charging the dc link means charging the dc link capacitor(s) shown in FIG. 2. In one arrangement, the rated dc link voltage is 1070 VDC and the dc link 50 is charged to 395 VDC. The firing angle of the power semiconductor devices in the rectifier 60 can start at a predetermined angle (e.g.,)150° and can then decrease at a predetermined rate determined by the required restart time and the charging current limit.

When the dc link 50 is partially charged, the machine bridge 48 of the AFE converter 44 is enabled and operated as an inverter to supply the partial dc link voltage to the electrical machine 34 to partially flux or magnetise the electrical machine. The semiconductor switching devices of the machine bridge 48 can be controlled using a pulse width modulation (PWM) strategy so that the output ac voltage of the machine bridge has a frequency synchronous to the rotor speed of the electrical machine. If the electrical machine does not allow the rotor speed to be measured (e.g., using a speed sensor or encoder) then the rotor speed can be estimated using a suitable estimation process. The semiconductor switching devices of the machine bridge 48 can also be controlled so that the output ac voltage has a predetermined magnitude, e.g., 210 VAC, so that the electrical machine is partially fluxed or magnetised to about 30% of the rated flux depending on the speed of the electrical machine and the partial dc link voltage.

The blackout restart system 54 is then electrically disconnected, typically by opening the dc contactor 62 to electrically disconnect the blackout restart system from the dc link 50. This allows the components of the blackout restart system 54, and in particular the power semiconductor devices of the rectifier 60, to be rated to the partial dc link voltage. Otherwise, if the blackout restart system 54 remains electrically connected to the dc link (but is disconnected from the emergency ac busbar 56) it will experience the increasing dc link voltage up to the rated voltage during the slip control process—see below. In some arrangements, the ac contactor 68 can be opened to electrically disconnect the blackout restart system 54 from the emergency ac busbar 56, or can be opened after the dc contactor 62 has been opened.

A slip control process is used to fully charge the dc link voltage from 395 VDC to the rated dc link voltage (i.e., 1070 VDC). It will be readily appreciated that before the slip control process is started, the electrical machine is partially fluxed or magnetised but the rotor speed is the same as the synchronous speed, i.e., the rotation rate of the magnetic field of the stator. There is no slip and consequently no torque is generated by the electrical machine. The slip control process is designed to provide a small difference (or slip) between the synchronous speed and the rotor speed so that a torque is generated. The generated torque can then be used to drive the electrical machine in a generating mode to fully charge the dc link.

Figure 5:
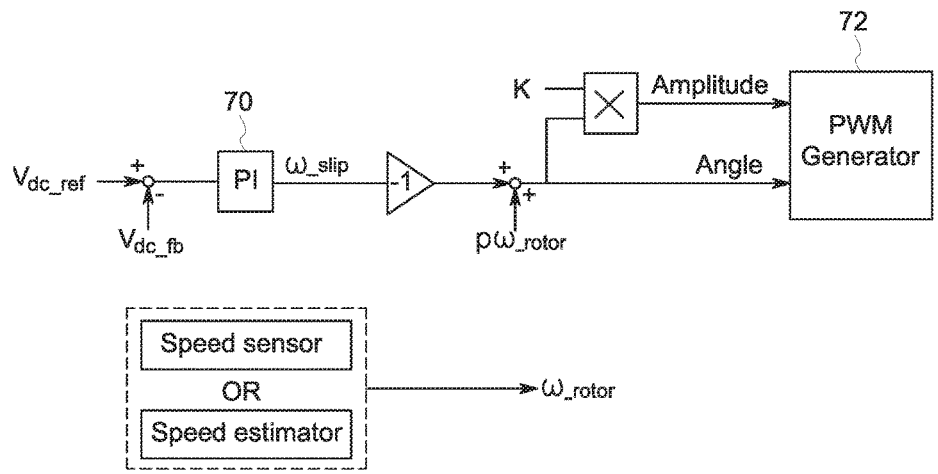
FIG. 5 is a schematic drawing showing a first slip control process.

A suitable slip control process is shown in FIG. 5. The process uses the rotor speed ω_rotor, which can either be measured (e.g., using a speed sensor or encoder) or estimated using a suitable estimation process. A dc link voltage reference Vdc_ref is compared with a dc link voltage feedback Vdc_fb that is provided by a voltage sensor. The output of the comparison is provided to a proportional-integral (PI) controller 70. The output of the PI controller 70, ω_slip, represents a target slip reference and is converted into a negative value (for negative slip since the electrical machine is operating as a generator and so rotor speed is greater than the synchronous speed) and summed with a value pω_rotor, where p is the number of pole pairs of the electrical machine 34. The sum is provided to a PWM generator 72 as phase angle information and is multiplied by a constant K and provided to the PWM generator as amplitude information. It will be readily appreciated that the phase angle information is indicative of the phase angle between the target voltage and the actual voltage and the amplitude information is indicative of the amplitude difference between the target voltage and the actual voltage. The PWM generator 72 can form part of a controller for the machine bridge 48.

Once the dc link is fully charged, the machine bridge 48 of the AFE converter 44 is enabled and operated as an inverter to supply the rated dc link voltage to the electrical machine 34 to fully flux or magnetise the electrical machine, i.e., to increase the flux to the rated flux.

Figure 6:
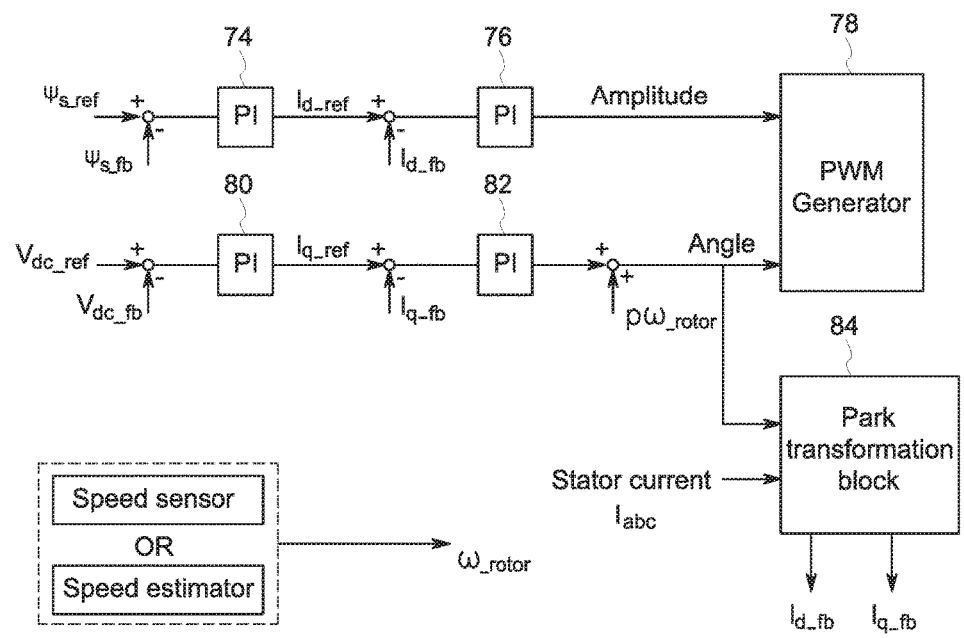
FIG. 6 is a schematic drawing showing a second slip control process.

In another arrangement, the slip control process can be used to fully charge the dc link to the rated dc link voltage and fully flux or magnetise the electrical machine simultaneously. Such a slip control process is shown in FIG. 6 and uses dq axis vector control. A flux reference Ψs_ref is compared with a flux feedback Ψs_fb. The output of the comparison is provided to a first PI controller 74. The output of the first PI controller 74 is a d-axis current reference Id_ref that is compared with a d-axis current feedback Id_fb. The output of the comparison is provided to a second PI controller 76. The output of the second PI controller 76 is provided to a PWM generator 78 as amplitude information. A dc link voltage reference Vdc_ref is compared with a dc link voltage feedback Vdc_fb that is provided by a voltage sensor. The output of the comparison is provided to a third PI controller 80. The output of the third PI controller 80 is a q-axis current reference Iq_ref that is compared with a q-axis current feedback Iq_fb. The output of the comparison is provided to a fourth PI controller 82. The output of the fourth PI controller 82 is summed with a value pω_rotor, where p is the number of pole pairs. The sum is provided to the PWM generator 78 as phase angle information. The sum is also provided to a Park transformation block 84 which also uses a measured value of the stator current Iabc to derive the d- and q-axis current feedbacks Id_fb and Iq_fb. The slip control process shown in FIG. 6 can be useful in some situations because the electrical machine 34 is regulated during the entire process and it allows the dc link voltage and the machine flux to be increased simultaneously by dynamically adjusting the flux reference Ψs_ref and the dc link voltage reference Vdc_ref.

Once the electrical machine is fully fluxed or magnetised, the blackout restart process is complete. The electrical machine can subsequently supply power to the main ac busbar 42 through the AFE converter 44 for recovery purposes. During the blackout restart process, the supply bridge 46 is not operated. But on completion of the blackout restart process, the supply bridge 46 is operated as an inverter and the machine bridge 48 is operated as an active rectifier. The results of a simulated blackout restart process are shown in FIGS. 7 to 11.

In the simulated blackout restart process, the blackout restart system is connected to the emergency ac busbar at 0.1 seconds and is disconnected from the emergency ac busbar at 2.7 seconds. A slip control process to fully charge the dc link is started at 3.2 seconds and is finished at 4.4 seconds. The electrical machine is fully fluxed at 4.4 seconds and this represents the end of the blackout restart process.

Figure 7:
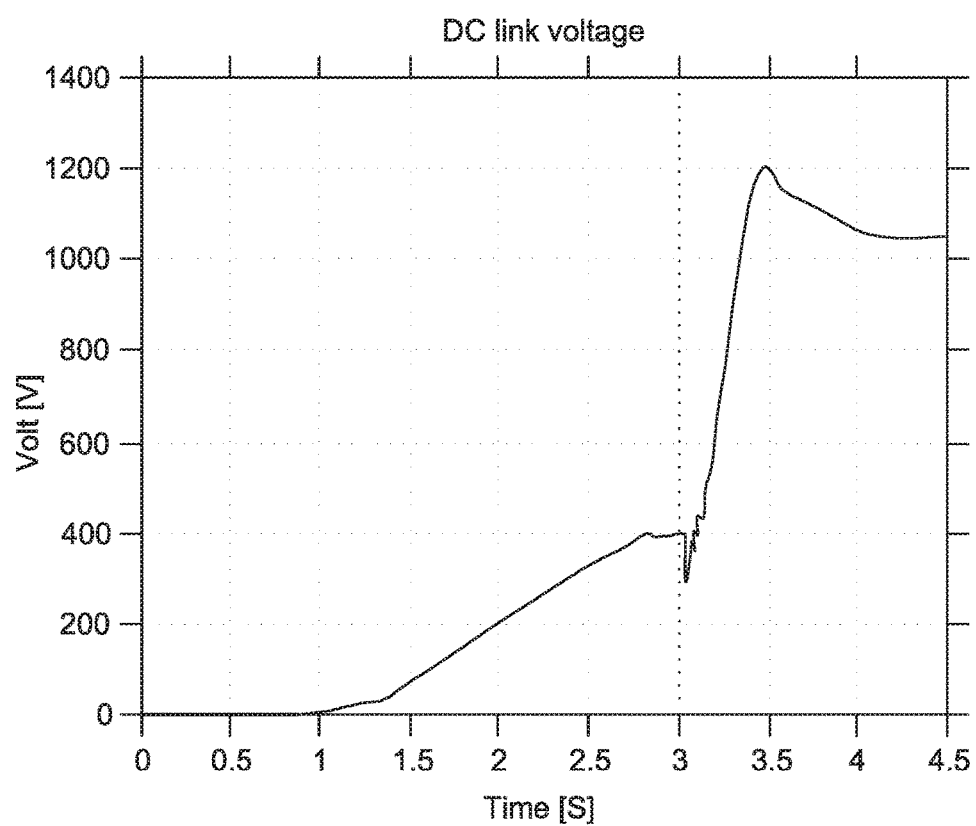
FIGS. 7, 8, 9, 10 and 11 are graphs showing the results of a simulated blackout restart process.

FIG. 7 shows that the dc link voltage is charged from 0 VDC to 395 VDC between 0.1 and 2.7 seconds and then more rapidly from 395 VDC to 1070 VDC after the slip control process is started at 3.2 seconds. The rate at which the dc link voltage increases can be controlled by the blackout restart system during the first stage of the blackout restart system (i.e., from 0.1 to 2.7 seconds) and by slip control process (e.g., by the PI controller 70) during the second stage of the blackout restart system (e.g., from 3.2 to 4.4 seconds).

Figure 8:
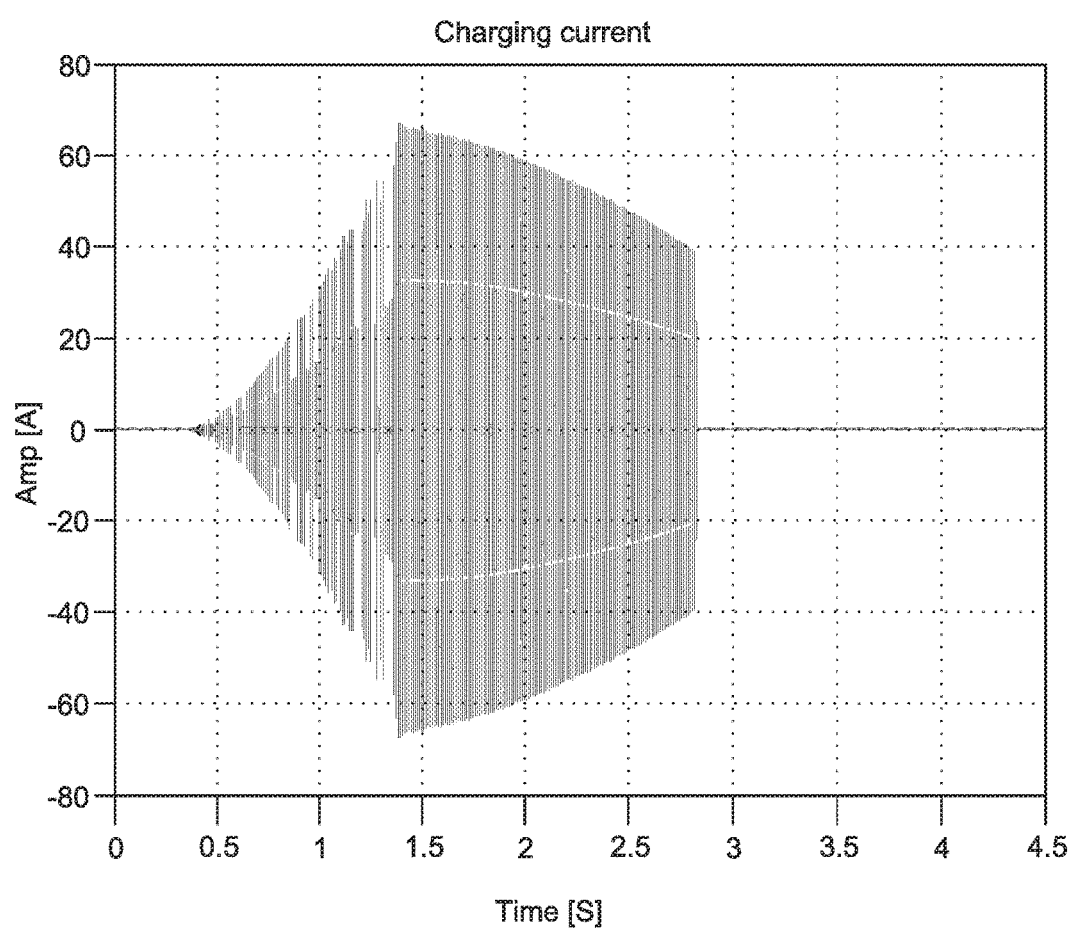

FIG. 8 shows that the charging current peaks at 68 A for about one cycle. This current can be controlled by the blackout restart system. A smaller peak current means that it will take longer to partially charge the dc link and vice versa.

Figure 9:
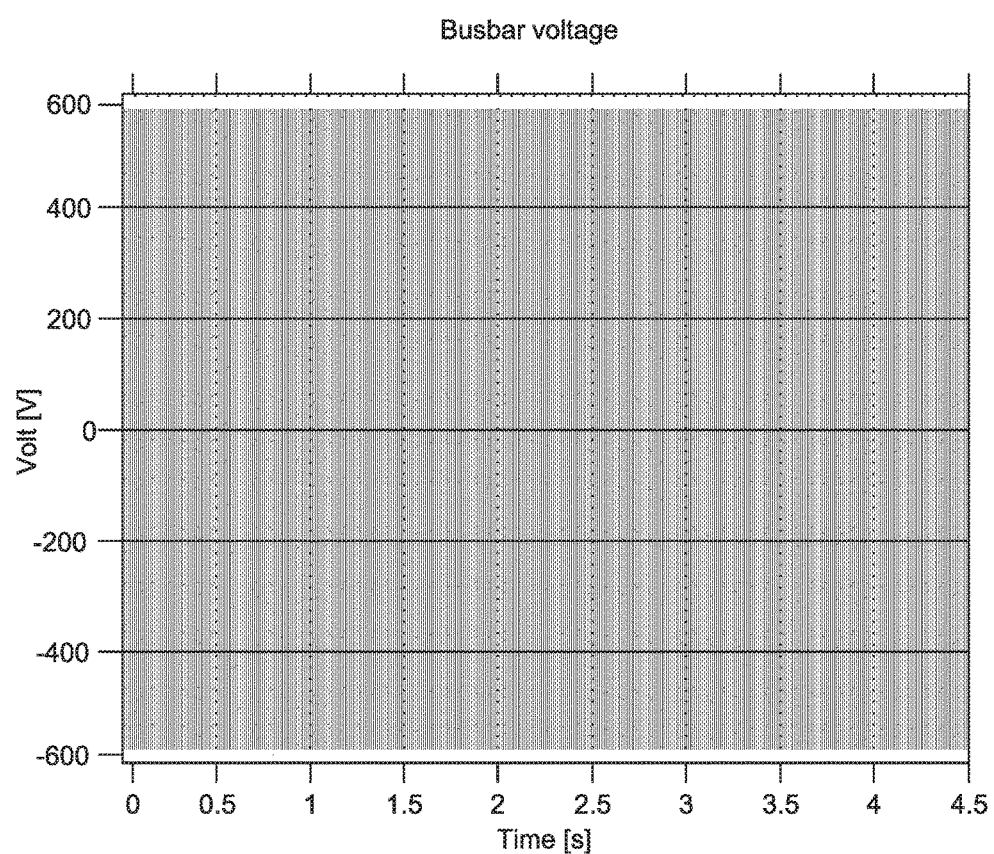

FIG. 9 shows that the voltage on the emergency ac busbar is not obviously affected by the blackout restart process. In the simulated blackout restart process, the emergency ac busbar only experiences a fall of about 5 V for less than about 300 ms.

Figure 10:
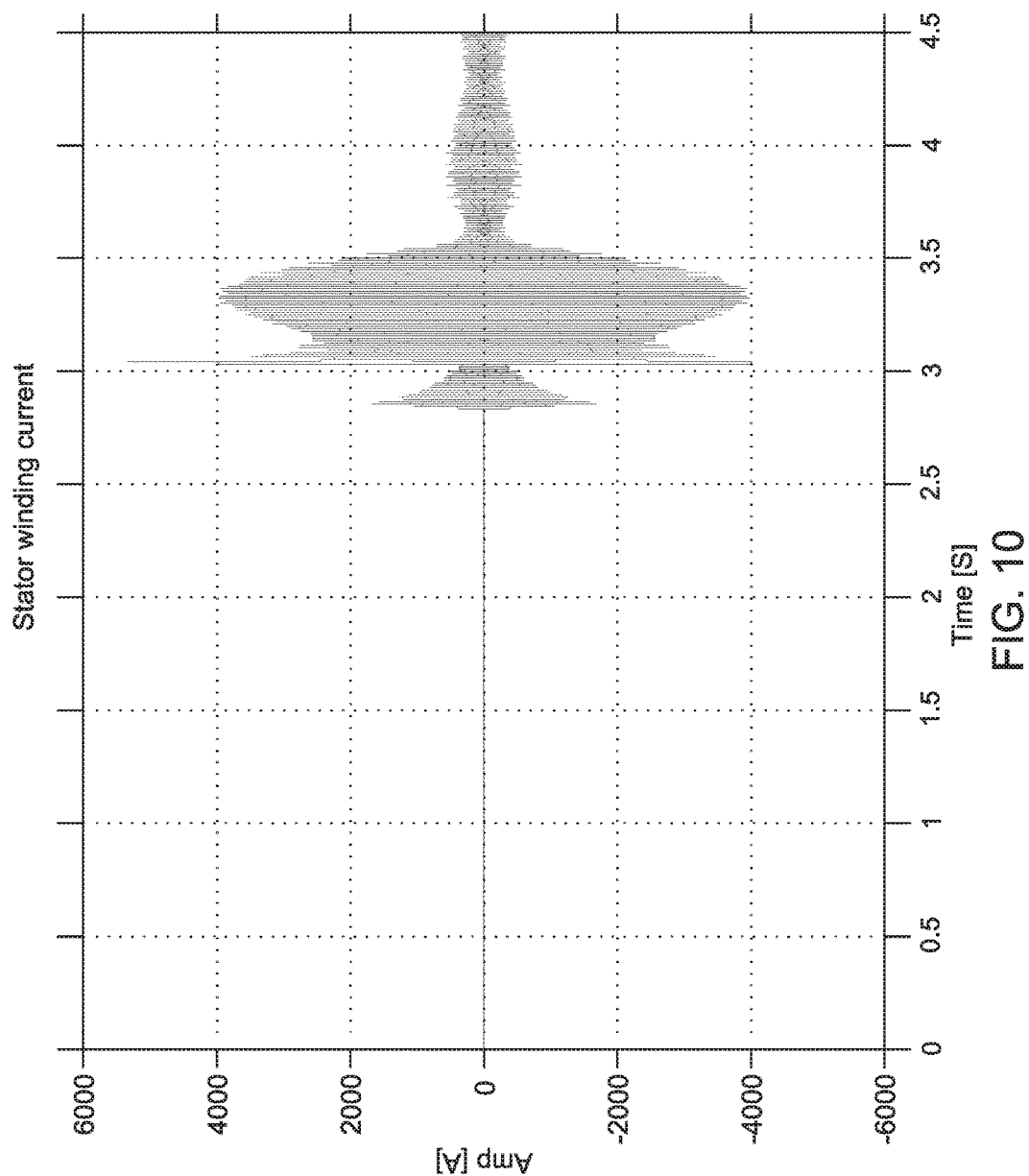
Figure 11:
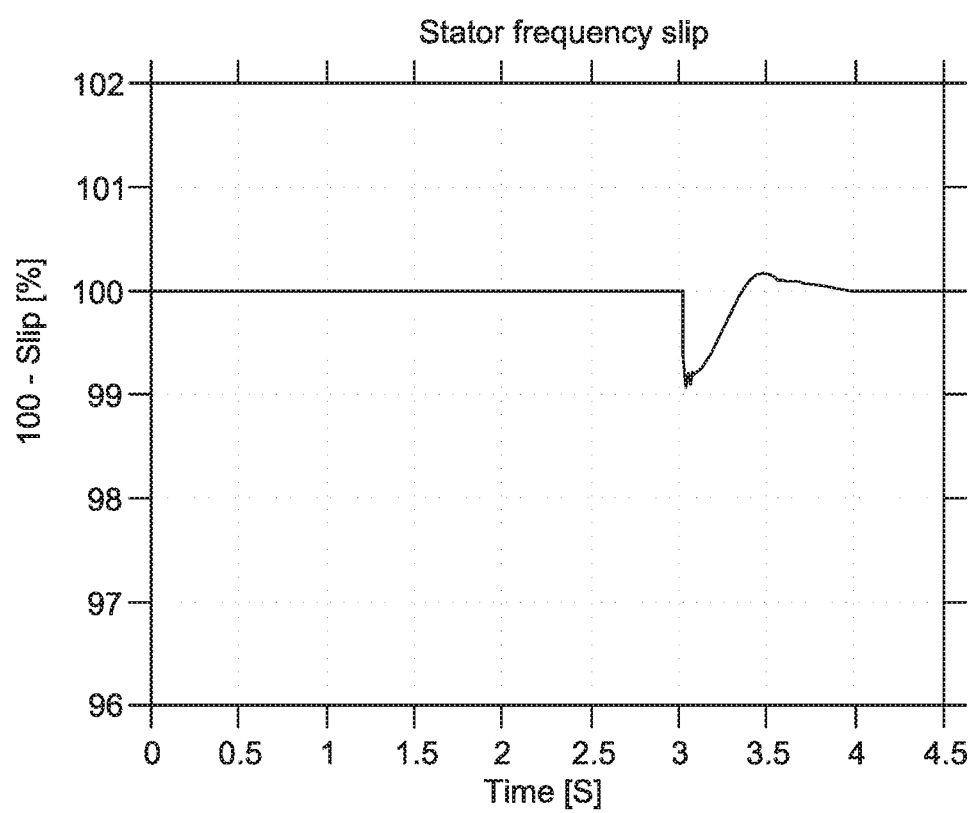

The stator winding current and stator frequency slip is shown in FIGS. 10 and 11, respectively. In the simulation, the electrical machine is a 2.8 MW, 690 VAC, 0.81 power factor, induction machine with a rated current of 2.9 kArms. During the slip control process, the charging current from the electrical machine reaches the rated current for about 15 cycles then decreases to less than 0.1 p.u. This is acceptable and the charging current can be further controlled by the slip control process (e.g., by the PI controller 70) as necessary. The slip during the slip control process is less than about 0.8% as the electrical machine charges the dc link using current generated from the torque, i.e., the active power. When the dc link is fully charged to the rated dc link voltage, the slip is about 0% as no active power is needed from the electrical machine to charge the dc link and no load current is needed.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution system comprising:
   a main ac busbar;
   an emergency ac busbar;
   a hybrid drive system comprising:
      an electrical machine and a prime mover, the rotor of the electrical machine and the driving end of the prime mover being mechanically coupled to a load, e.g., by means of a mechanical linkage such as a gearbox;
      a first active rectifier/inverter having:
         ac input terminals electrically connected to the main ac busbar, and
         dc output terminals;
      a second active rectifier/inverter having:
         dc input terminals electrically connected to the dc output of the first active rectifier/inverter by a dc link, and
         ac output terminals electrically connected to the electrical machine; and
      a blackout restart system comprising a rectifier having ac input terminals selectively electrically connectable to the emergency ac busbar, and dc output terminals selectively electrically connectable to the dc link.

2. A power distribution system according to claim 1, wherein the rectifier is an active rectifier with a series of semiconductor power switching devices.

3. A power distribution system according to claim 1, wherein the rectifier is a passive rectifier.

4. A power distribution system according to claim 1, wherein the ac input terminals of the rectifier are electrically connected to the emergency ac busbar by an ac contactor.

5. A power distribution system according to claim 1, wherein the dc output terminals of the rectifier are electrically connected to the dc link by a dc contactor.

6. A power distribution system according to claim 1, wherein the blackout restart system further includes a transformer having primary and secondary windings.

7. A power distribution system according to claim 4, wherein the blackout restart system further includes a transformer having primary and secondary windings, the primary winding being connected to the ac contactor and the secondary winding being connected to the ac input terminals of the rectifier.

8. A power distribution system according to claim 1, being a marine power distribution or a marine power distribution and propulsion system, and wherein the hybrid drive system is used to drive a propeller or propulsion thruster.

9. A method of operating the power distribution system according to claim 1 in the event of an electric power blackout situation, the method including the steps of:
   electrically connecting the blackout restart system between the emergency ac busbar and the dc link);
   supplying power from the emergency ac busbar to the dc link through the blackout restart system to increase the dc link voltage to a partial dc link voltage that is less than the rated dc link voltage;
   operating the second active rectifier/inverter as an inverter to supply the partial dc link voltage to the electrical machine to increase the magnetic flux of the electrical machine to a partial magnetic flux that is less than the rated magnetic flux;
   electrically disconnecting the blackout restart system from the emergency ac busbar and/or the dc link;
   supplying current from the electrical machine to the dc link through the second active rectifier/inverter to increase the dc link voltage to the rated dc link voltage; and
   increasing the magnetic flux of the electrical machine to the rated magnetic flux.

10. A method of operating a power distribution system in the event of an electric power blackout situation, the power distribution system comprising:
   a main ac busbar;
   an emergency ac busbar;
   a hybrid drive system comprising:
      an electrical machine and a prime mover, the rotor of the electrical machine and the driving end of the prime mover being mechanically coupled to a load, e.g., by means of a mechanical linkage such as a gearbox;
      a first active rectifier/inverter having:
         ac input terminals electrically connected to the main ac busbar, and
         dc output terminals;
      a second active rectifier/inverter having:
         dc input terminals electrically connected to the dc output of the first active rectifier/inverter by a dc link, and
         ac output terminals electrically connected to the electrical machine;
   wherein the method comprises the steps of:
   supplying power from the emergency ac busbar to the dc link to increase the dc link voltage to a partial dc link voltage that is less than the rated dc link voltage;
   operating the second active rectifier/inverter as an inverter to supply the partial dc link voltage to the electrical machine to increase the magnetic flux of the electrical machine to a partial magnetic flux that is less than the rated magnetic flux;
   supplying current from the electrical machine to the dc link through the second active rectifier/inverter to increase the dc link voltage to the rated dc link voltage; and
   increasing the magnetic flux of the electrical machine to the rated magnetic flux.

11. A method according to claim 9, wherein, during the step of operating the second active rectifier/inverter as an inverter to supply the partial dc link voltage to the electrical machine, the second active rectifier/inverter is controlled so that the output ac voltage of the second active rectifier/inverter has a predetermined magnitude and/or a frequency substantially synchronous to the rotating angular velocity of the electrical machine.

12. A method according to claim 9, wherein the partial dc link voltage is between about 10% and about 40%, of the rated dc link voltage and the partial magnetic flux is between about 10% and about 40%, of the rated magnetic flux of the electrical machine.

13. A method according to claim 9, wherein a slip control process is used to supply current from the electrical machine to the dc link.

14. A method according to claim 9, wherein the second active rectifier/inverter is operated as a rectifier to supply current from the electrical machine to the dc link to increase the dc link voltage to the rated dc link voltage and then subsequently operated as an inverter to supply the rated dc link voltage to the electrical machine to increase the magnetic flux of the electrical machine to the rated magnetic flux.

15. A method according to claim 9, wherein the second active rectifier/inverter is operated as a rectifier to supply current from the electrical machine to the dc link to increase the dc link voltage to the rated dc link voltage whilst at the same time the magnetic flux of the electrical machine is increased to the rated magnetic flux.

16. A method according to claim 10, wherein, during the step of operating the second active rectifier/inverter as an inverter to supply the partial dc link voltage to the electrical machine, the second active rectifier/inverter is controlled so that the output ac voltage of the second active rectifier/inverter has a predetermined magnitude and/or a frequency substantially synchronous to the rotating angular velocity of the electrical machine.

17. A method according to claim 10, wherein a slip control process is used to supply current from the electrical machine to the dc link.

18. A method according to claim 10, wherein the partial dc link voltage is between about 10% and about 40%, of the rated dc link voltage and the partial magnetic flux is between about 10% and about 40%, of the rated magnetic flux of the electrical machine.

19. A method according to claim 10, wherein the second active rectifier/inverter is operated as a rectifier to supply current from the electrical machine to the dc link to increase the dc link voltage to the rated dc link voltage and then subsequently operated as an inverter to supply the rated dc link voltage to the electrical machine to increase the magnetic flux of the electrical machine to the rated magnetic flux.

20. A method according to claim 10, wherein the second active rectifier/inverter is operated as a rectifier to supply current from the electrical machine to the dc link to increase the dc link voltage to the rated dc link voltage whilst at the same time the magnetic flux of the electrical machine is increased to the rated magnetic flux.

* * * * *